United States Patent Office.

SIMON STEVENS, OF NEW YORK, N. Y.

Letters Patent No. 60,956, dated January 1, 1867.

---

IMPROVED MODE OF STORING PETROLEUM AND OTHER LIQUIDS SO AS TO PREVENT LOSS FROM FIRE.

---

*The Schedule referred to in these Letters Patent and making part of the same.*

---

TO ALL WHOM IT MAY CONCERN:

Be it known that I, SIMON STEVENS, of the city, county, and State of New York, have made a new and useful Improvement in Storing Petroleum and similar inflammable liquids, so as to prevent accidents from fire; and I hereby declare the following to be a full and exact description of the same.

The nature of my invention consists in providing tanks filled with water, into which the casks, cans, or other vessels containing petroleum or other oils are immersed, so as to be entirely surrounded by water. Such tanks may be placed in the cellar or other part of any building, or in the holds of ships and boats, or in any suitable place. By means of this improvement it will be practicable to carry petroleum and similar liquids in passenger ships and steamers, without danger from fire. The size of the water tanks may be varied to suit the quantity to be stored. For large warehouses the entire cellar may be a water cistern or tank. On ships or boats such provision should be made as to contain the amount of petroleum which it is desirable to carry in water-covered tanks or bulk-heads. I have described the receptacle for the oil barrels, casks, or other vessels, as a tank, but any excavation, pond, trench, dock, or other structure which will hold water, of sufficient capacity to hold the amount to be stored at any one time, will answer the purpose of my invention. Petroleum being lighter than water, the casks or cans containing it should be weighted with metal or stone so as to sink in water. A convenient mode is to have plates or disks of cast iron to fit within the "chimes" of casks, or they may be kept submerged by any suitable means. When a tank or trench is used the top may be covered by a skeleton frame or lid, which when closed will be just beneath the surface of the water and keep the oil vessel submerged. These frames or covers may be hinged at each side of the tank, and when closed will force the oil casks below the surface of the water. The ordinary grappling iron and tackle used to load and discharge vessels may be used to introduce and remove casks, cans, and other vessels from the water tanks.

I do not claim broadly the storing of petroleum under water, as I am aware that tanks immersed in water have been constructed.

Having described my invention, what I claim, and desire to secure by Letters Patent of the United States, is—

The mode herein described for the storing of petroleum or other similar inflammable liquids, so as to prevent accident by fire.

SIMON STEVENS.

Witnesses:
EDGAR IRVING,
GEO. P. WILLEY.